United States Patent Office 3,424,679
Patented Jan. 28, 1969

3,424,679
NONVICINAL GLYCOLS IN OVERBASED PHENATE PREPARATION
Nylen L. Allphin, Jr., Pinole, Calif., assignor to Chevron Research Company, San Francisco, Calif., a corporation of Delaware
No Drawing. Filed Aug. 15, 1966, Ser. No. 572,177
U.S. Cl. 252—33
Int. Cl. C10m 1/38, 3/34, 7/38
6 Claims

ABSTRACT OF THE DISCLOSURE

Improved process for preparing sulfurized overbased phenates, employing nonvicinal glycols of from 3 to 4 carbon atoms.

---

This invention concerns a novel method for preparing overbased phenates. More particularly, this invention concerns a novel basis for preparing overbased phenates wherein the polyhydric alcohol is substantially recovered.

Overbased phenates are widely used as detergents in lubricating oil, as well as for neutralizing acid, which is formed during the operation of an engine. By overbased phenate is intended alkylphenols, generally having been sulfurized—sulfur bridges being present between the alkylphenol groups—having more equivalents of an alkaline earth metal present than the number of equivalents of phenol. This can be achieved by dispersing the excess alkaline earth metal as its carbonate.

Numerous patents have issued on the preparation of overbased phenates. Usually, a polyhydric alcohol having vicinal hydroxyl groups, particularly ethylene glycol, is employed. See for example U.S. patents Nos. 2,680,096, 3,036,971 and 3,178,368. While ethylene glycol has been the preferred polyhydric alcohol, it is found that losses of the polyhydric alcohol during the reaction are severe, sometimes even exceeding 50% of the glycol charged. During the preparation of the overbased phenates, all or almost all of the volatile material is removed by distillation in vacuo. A high molecular weight ($C_8$ or greater) monohydric alcohol is also present which acts as a chaser for removing all of the lower boiling material. However, the glycol which is recovered overhead is far less than the glycol charged. Therefore, the loss of ethylene glycol indicates that the glycol is bound or changed in some way so as not to be readily removed from the reaction product.

It has now been found that nonvicinal diols of from 3 to 4 carbons atoms (i.e., 1,3- and 1,4-diols) may be used in the preparation of overbased phenates to obtain high alkalinity values and be substantially completely recovered so as to be recycled for use without excessive loss. In the overbased phenate process simplest form, initially there is generally employed a sulfurized alkylphenol—utilized as a sulfurized alkylphenol or prepared in situ by the reaction of sulfur with alkylphenol using a basic catalyst—a monohydric high molecular weight alcohol, a dihydric alcohol, alkaline earth base—calcium or barium oxide or hydroxide (calcium hydride may also be used)—and a hydrocarbon liquid; a relatively small amount of an alkaline earth metal sulfonate may also be added. The mixture is heated and water is taken off overhead, followed by passing carbon dioxide into the mixture at an elevated temperature, until no more carbon dioxide is absorbed. The dihydric alcohol and part or all of the monohydric alcohol are then distilled over, usually bringing with it some of the hydrocarbon liquid. The residue is then filtered. Summarizing the materials that are used in the process: sulfurized alkylphenol, a high molecular weight monohydric alcohol, a dihydric alcohol, sulfonate, alkaline earth metal base and hydrocarbon liquid.

While both calcium or barium or both are used in the preparation of overbased phenates, calcium is usually the preferred alkaline earth metal. In the present description of the process, calcium will be frequently referred to. It is to be understood, however, that barium may be used in its place.

The sulfurized alkylphenol will be considered first. Various methods of preparing sulfurized alkylphenols are known in the art. The particular method employed is not critical to this invention. U.S. Patent No. 2,409,867 describes a method of sulfurizing using sulfur monochloride and an alkylphenol in an inert solvent. U.S. Patents Nos. 2,680,096 and 3,178,368 describe sulfurizing using sulfur with calcium phenoxide in the presence of ethylene glycol. (In the present invention, the ethylene glycol would be replaced with a nonvicinal diol of from 3 to 4 carbon atoms.)

The alkylphenol will usually have alkyl groups having an average of from about 9 to 18 carbon atoms, each alkyl group being of from about 9 to 35 carbon atoms. The alkyl groups may be branched chain or straight chain, but usually at least 60 mole percent of the alkyl groups will be branched chain, e.g., polypropenyl, the branches usually being methyl.

Depending on the method of sulfurization, various solvents or liquids may be used. Illustrating such solvents are hydrocarbonaceous fluids used as lubricating oils (subsequently to be described in more detail), inert hydrocarbons, both aromatic and aliphatic, etc. The concentration of the reactants may be varied widely. In sulfurizing with sulfur, the weight ratio of sulfur to alkylphenol will be in the range of about 1:0.9–10, usually about 1:2–6. When calcium oxide is used as the catalyst, the weight ratio of sulfur to calcium oxide will generally be about 4–10:1. The diol will usually be added in small amounts.

Elevated temperatures are used for the sulfurization, the temperature depending on the particular reactants. Generally, sulfurization temperatures with sulfur will be in the range of about 200° to 350° F. The reaction will be carried out so that the water of reaction is removed as formed or after most of the sulfurization has occurred.

The sulfurized alkylphenol, either as the phenol or calcium salt, will generally have from about 5 to 12 weight percent sulfur.

Alternatively, the sulfurization can be carried out in the presence of all of the reactants used prior to carbonation. That is, all or almost all of the materials to be used in the preparation of the overbased phenate are added together, including sulfur, and the sulfurization carried out by heating the mixture to a temperature at which sulfurization occurs.

The high molecular weight monohydric alcohol, which is used in amounts of not more than 75 weight percent of the sulfurized alkylphenol charge, preferably 10 to 50 weight percent, are those monohydric alcohols containing from about 8 to 18 carbon atoms, preferably 9 to 15 carbon atoms. These alcohols are exemplified as follows: octyl alcohol, decyl alcohol, dodecyl alcohol, tridecyl alcohol, tetradecyl alcohol, hexadecyl alcohol, etc.

The dihydric alcohol is of from 3 to 4 carbon atoms and has the hydroxyl groups separated by at least 3 carbon atoms; that is, the dihydric alcohols are nonvicinal. Illustrative alcohols are 1,3-propanediol, 1,3-butanediol and 1,4-butanediol. The significant fact in the effective use of these dihydric alcohols is that the hydroxyl groups are not on the same carbon atoms or on adjacent carbon atoms.

The basic sulfonates which are employed contain from 0 to 300 percent, usually 0 to 100 percent, of metal in excess of the metal of normal sulfonates—essentially neutral metal sulfonates. See U.S. Patent No. 3,178,368. By neutral metal sulfonates are intended sulfonates wherein the sulfonic acid moiety and the metal moiety are present in equivalent amounts. The nature of metal sulfonates permits an excess of metal cation to be dispersed in an essentially hydrocarbon medium.

The basic sulfonates used herein are derived from neutral sulfonates represented by the formula:

$$[(R^1)_a ASO_3]_2 M^1$$

wherein $R^1$ is a high molecular weight straight chain or branched chain, saturated or unsaturated, essentially hydrocarbon radical, usually aliphatic, having a molecular weight of about 150 to about 800; A is an aromatic hydrocarbon radical, such as benzene, naphthalene, anthracene, etc.; $a$ is a number having the value of 1 to 4; and $M^1$ is an alkaline earth metal, usually barium or calcium.

Examples of suitable hydrocarbon radicals substituted on the aromatic ring for the sulfonate are the following: dodecane, hexadecane, eicosane, triacontane radicals; radicals derived from petroleum hydrocarbons, such as white oil, wax, etc.; radicals derived from olefin polymers such as polypropylene or polybutylene, etc. The sulfonic acids used in preparing the basic sulfonates of this invention also include the oil soluble sulfonic acids obtained from petroleum, such as the mahogany acids, and the synthetic sulfonic acids prepared by various methods of synthesis.

The metal sulfonates are exemplified as follows: calcium white oil benzene sulfonate, calcium dipolypropylene benzene sulfonate, calcium mahogany petroleum sulfonate, calcium triacontyl benzene sulfonate, barium mahogany sulfonate, barium white oil benzene sulfonate, etc.

The alkaline earth metal bases are generally calcium and barium oxide or hydroxide. However, calcium hydride may also be used, if desired.

The amount of oxide or hydroxide used will depend on wether calcium cation has been used in the sulfurization of the alkylphenol and the amount of calcium desired in the final product. It is found that at least about 80% of the inorganic calcium added is incorporated into the product, so that an excess of from about 5 to 20 weight percent of calcium over that to be incorporated in the final product will be employed.

The weight ratio of the total amount of calcium source (or barium), e.g., calcium oxide or hydroxide, used—both during sulfurization and subsequent calcium addition—based on sulfurised alkylphenol will be from about 0.25 to 0.7, more usually from about 0.45 to 0.6 (the higher portion of the range for barium).

The several components which are used in this process are used in certain mole or weight proportions with respect to each other. For each mole of alkylphenol, it is desirable to use from about 0.01 to 0.5 mole of sulfonate, preferably from about 0.01 to 0.05 mole, from 0.1 to 1.5 moles of high molecular weight alcohol, and at least about 1.5 to 4 moles of calcium. The dihydric alcohol will have a calcium/dihydric alcohol mole ratio of from about 3 to 1 to about 0.25 to 1, more usually from about 2 to 1 to about 1 to 1.

The equivalents of carbon dioxide used are at least equal to the equivalents of alkaline earth metal oxide charged less the equivalents of phenolic hydroxyl present and generally not more than one-fold greater.

Generally, when preparing the phenates, a lubricating oil will be used as a reaction medium. Thus, by such use of a lubricating oil, oil concentrates of the desired highly basic carbonated sulfurized alkaline earth metal phenate can be obtained directly. Such lubricating oils include a wide variety of lubricating oils, such as petroleum derived oils: naphthenic base, paraffin base, asphaltic base and mixed base lubricating oils; other hydrocarbon lubricants, e.g., lubricating oils derived from coal products and the synthetic oils, e.g., alkylene polymers; as well as non-hydrocarbon lubricating oils such as the alkylene oxide type polymers; etc.

The amount of reaction medium, e.g., oil, will generally be from about 10 to 55 weight percent of the total composition, more usually from about 15 to 40 weight percent of the total composition during the reaction, and from about 35 to 45 weight percent of the final composition after removal of the nonvicinal diol and all or part of the high molecular weight alcohol.

Also included in the final composition is from about 0.0005 to 0.01 weight percent of the total composition of an antifoaming or defoaming agent.

In preparing the overbased carbonated sulfurized calcium alkylphenates, the order in which the various materials are combined is not critical with the exception of of carbonation. Generally, it is convenient to add all of the reactants with the exception of the sulfurized alkylphenol to the reactor, heat the reactants to a temperaure in the range of about 300° to 400° F. and remove the water formed by the reaction between the lime and any hydroxylic species present. After removal of the water, the sulfurized alkylphenol is then added while maintaining an elevated temperature in the above-indicated range. Any additional water which is formed is then removed, the water usually bringing with it some diol and high molecular weight alcohol.

Alternatively, as previously described, the sulfurized alkylphenol may be formed in situ, removing the water of reaction as formed.

After heating the reaction mixture for from about one-half hour to about two hours, carbonation is begun by introducing gaseous carbon dioxide into the reaction mixture at relatively moderate pressures, e.g., less than 50 p.s.g. The carbonation is exothermic and cooling may be required to maintain the temperature in the desired range. The temperature during carbonation is usually in the range of about 275° to 375° F.

At the end of this time, the diol is removed by distillation, using a moderate vacuum. Generally, the temperature is maintained in the range of about 350° to 500° F. and the pressure in the range of about 10 to 100 mm. Hg. Also, as desired, from about 30 to 100% of the high molecular weight alcohol may be removed. The product is filtered, any convenient method of filtration being used. Usually, a diatomaceous earth filter aid is used. After filtration, the product is ready to be used as a detergent in lubricating oils.

The composition and properties of the final product are as follows:

TABLE I

| | Composition, Weight percent | |
|---|---|---|
| | Broad Range | Narrow Range |
| Sulfurized alkylphenol | 20–50 | 25–40 |
| Sulfur (combined with alkylphenol) [1] | 1–5 | 3–5 |
| Sulfonic acid | 3–8 | 4–6 |
| Carbon dioxide | 4–7 | 4–6 |
| Ca [2] | 8–11 | 8–10 |
| Monohydric alcohol (>8 carbon atoms) | 0–10 | 0–7 |
| | Properties | |
| Viscosity, SUS (ASTM D-446) 210° F | [3] 300–700 | |
| Alkalinity value | 252–308 | |

[1] Weight percent of S is included in sulfurized alkylphenol weight percent.
[2] The Ca is in combined form with the various acidic species present in the composition.
[3] The weight percent of oil will be in the range of 35 to 45 weight percent of the composition.

The remainder of the composition is the base oil. Of course, the above-indicated compositions may be diuted so that the above weight percents are relative to each other, and not absolute. The base oil will usually be about 15 to 55 weight percent in the concentrate.

In order to demonstrate the almost total recovery of the nonvicinal glycols, the following preparations were carried out of highly overbased phenates, determining the recovery of the glycols.

The following examples are offered by way of illustration and not by way of limitation.

EXAMPLE I

Into a reaction vessel was introduced 368 g. of tetrapropenylphenol, 302 g. of a Mid-Continent 100 neutral oil, 108 g. of decyl alcohol and 29 g. of basic calcium sulfonate (derived from 480 neutral oil, containing 40% calcium in excess of that amount for a neutral sulfonate) and the mixture heated to 170° F. To this mixture was then added 73 g. of sulfur and 165 g. of calcium hydroxide. The heating was continued and the temperature slowly raised while 134 g. of 1,3-propanediol was added. Water was taken overhead while continually raising the temperature, so that over a period of about 2 hours from the addition of the sulfur and calcium hydroxide, the temperature had reached 340° F.

While maintaining the temperature or allowing it to drop slightly, 50 g. of carbon dioxide was added over about a 3 hour period. The temperature was then slowly raised to 400° F. while the pressure was diminished to 40 mm. Hg and all the volatile material taken overhead.

The alkalinity value of the product (mg. KOH/g. of sample) was 238, 239.

By using 1,3-propanediol labeled with $C^{14}$, the product was analyzed and found to have essentially no residual 1,3-propanediol in any form. Moreover, the diol recovered was 96 percent of charged.

EXAMPLE II

Into a reaction vessel was introduced 174 g. of tetrapropenylphenol, 151 g. of a Mid-Continent 100 neutral oil, 54.2 g. of tridecyl alcohol, 18.2 g. of basic calcium sulfonate (derived from 480 neutral oil containing 40 percent calcium in excess of that amount for a neutral sulfonate) and 36.5 g. of sulfur and the mixture heated to 170° F. The temperature was slowly raised to 260° F. while 83 g. of lime and 72 g. of 1,4-butanediol were slowly added. Water was taken overhead. The temperature was then raised over a 2 hour and 20 minute period from 260° to 350° F. while continuing to take water overhead. At the end of this time, the temperature was maintained or allowed to drop slightly, while 25 g. of carbon dioxide was added over a period of 120 minutes. The temperature was then slowly raised to 420° F. while the pressure was dropped to 40 mm. Hg and all the volatile material taken overhead.

The product was filtered and the alkalinity value determined: 217, 225 mg. KOH/g. of sample.

Of the 72 g. of 1,4-butanediol charged, 69 g. was recovered overhead. By comparison, in a typical run carried out in the same manner using 62 g. of ethylene glycol, about 30 g. is lost.

It is evident from the above examples that in extreme contrast to the ethylene glycol, when nonvicinal diols of from 3 to 4 carbon atoms are used, almost total recovery of the dihydric alcohol is achieved. For the nonvicinal diols, almost the only loss can be related to mechanical difficulties, while with the ethylene glycol, the loss is 40 percent of that which is charged or greater. Furthermore, highly overbased phenates are obtained having high alkalinity values and therefore high alkalinity reserve, which is extremely desirable for the phenate detergents in lubricating oils. Furthermore, the compositions are readily filterable and compatible with a wide variety of lubricating oils.

As will be evident to those skilled in the art, various modifications on this invention can be made or followed in the light of the foregoing disclosure and discussion, without departing from the spirit or scope of the disclosure or from the scope of the following claims.

I claim:
1. A method for preparing an overbased phenate composition, wherein the polyhydric alcohol is almost totally recovered from the reaction mixture which comprises:
    (1) combining sulfurized alkylphenol having from 5 to 12 weight percent sulfur, wherein the alkyl groups are of an average of from 9 to 18 carbon atoms in a single addition, with an alkaline earth metal oxide or hydroxide, wherein said alkaline earth metal is calcium or barium, in the presence of a nonvicinal diol of from 3 to 4 carbon atoms, an alkanol of at least 8 carbon atoms, a calcium hydrocarbon sulfonate and a hydrocarbonaceous liquid at a temperature in the range of 300° to 400° F., wherein the calcium or barium to nonvicinal diol mole ratio is in the range of 3 to 1 to about 0.25 to 1, the alkylphenol to sulfonate mole ratio is in the range of 1:0.01–0.5, the mole ratio of alkylphenol to alkanol is in the range of 1:0.1–1.5, and alkaline earth metal oxide or hydroxide to alkylphenol mole ratio is in the range of 1.5 to 4,
    (2) removing the water of reaction overhead,
    (3) adding carbon dioxide in at least stoichiometric amount based on the alkaline earth metal uncombined with phenol,
    (4) distilling diol and alkanol overhead, leaving from 0 to 70 weight percent of the alkanol, and
    (5) filtering.
2. A method according to claim 1, wherein said alkaline earth metal is calcium.
3. A method according to claim 1, wherein said nonvicinal diol is 1,3-propanediol.
4. A method according to claim 1, wherein said nonvicinal diol is 1,4-butanediol.
5. A method according to claim 1, wherein the mole ratio of alkylphenol to sulfonate is in the range of 1:0.01–0.05.
6. A method according to claim 1, wherein said alkaline earth metal is calcium, said nonvicinal diol is 1,3-propanediol and said alkylphenol to sulfonate mole ratio is in the range of 1:0.01–0.05.

References Cited

UNITED STATES PATENTS

| | | | |
|---|---|---|---|
| 2,680,096 | 6/1954 | Walker et al. | 252—42.7 |
| 2,680,097 | 6/1954 | Stewart | 252—42.7 |
| 3,036,971 | 5/1962 | Otto | 252—42.7 |
| 3,178,368 | 4/1965 | Hanneman | 252—42.7 |
| 3,194,761 | 7/1965 | Fox et al. | 252—42.7 |

FOREIGN PATENTS 589,609  12/1959  Canada.

DANIEL E. WYMAN, *Primary Examiner.*

C. F. DEES, *Assistant Examiner.*

U.S. Cl. X.R.

252—18, 25, 42.7